TIME-SCALED TEST CIRCUIT FOR SEMICONDUCTIVE ELEMENT
HAVING A CURRENT CONTROLLED CHARGE STORAGE MODEL
Filed Dec. 4, 1967

INVENTOR
B. T. MURPHY
BY H. W. Lockhart
ATTORNEY

United States Patent Office 3,480,864
Patented Nov. 25, 1969

3,480,864

TIME-SCALED TEST CIRCUIT FOR SEMICONDUCTIVE ELEMENT HAVING A CURRENT CONTROLLED CHARGE STORAGE MODEL

Bernard T. Murphy, New Providence, N.J., assignor to Bell Telephone Laboratories, Incorporated, Murray Hill, N.J., a corporation of New York Filed Dec. 4, 1967, Ser. No. 687,626
Int. Cl. G01r *11/00;* H03k *3/26, 19/08*
U.S. Cl. 324—158 6 Claims

ABSTRACT OF THE DISCLOSURE

An analog model of a semiconductive element in a circuit can be achieved by utilizing the element itself as its DC model and proportionately multiplying stored charge to effect time scaling for the AC model. Voltage controlled charge storage is modeled by shunting the region of controlled charge storage with suitably chosen capacitors. Current controlled charge storage is modeled by sampling the controlling currents and applying voltages derived therefrom to resistance-conductance-capacitance networks. This allows representation of both carrier recombination and diffusion delays. Feedback paths among the sampling devices are used to provide a unique correspondence between charge stored in the element and charge stored in the model.

BACKGROUND OF THE INVENTION

This invention relates to solid state devices and circuits and more particularly to analog models for analysis and testing of solid state devices and circuits.

In the copending patent application of Gummel and applicant Murphy, Ser. No. 642,445, filed May 31, 1967, and assigned to the assignee hereof, a novel type of analog models for solid state devices is disclosed. In that disclosure it is suggested that one can achieve significant reductions in model complexity and time involved by using the device to be modeled both as its own DC model and as an element of its AC model, and multiplying stored charge to effect time scaling of AC characteristics. Using the techniques disclosed therein, audio frequency self-analog models of microwave frequency devices can be constructed using physical realization of charge control theory. These models accurately describe transistor performance in the active mode of operation.

The teachings of Gummel-Murphy, referred to hereinabove, are based upon the charge control concept of modeling, (Sparks and Beaufoy, "The Junction Transistor as a Charge Control Device," ATEJ, vol. 13, 1957), and, as more fully described hereinbelow, are inadequate for certain interesting modes of solid state device operation, e.g., a transistor in the saturation mode.

SUMMARY OF THE INVENTION

The present invention is based upon the physical realization of a distinctive combination of the charge control model and selected characteristics from the multiple-lump, resistance-conductance-capacitance (R-G-C) transmission line analogies of Linvill and others, (Linvill and Gibbons, "Transistors and Active Circuits," McGraw-Hill, 1961).

As is well known, the charge control model, though very convenient for analysis, is deficient in not accounting for minority carrier diffusion delays, herein referred to as redistribution effects. This redistribution effect must be accounted for in modes of device operation characterized by zones of charge storage over some characteristic distance of the order of or greater than a diffusion length, e.g., an epitaxial transistor operating in a saturated mode.

It is also known that the Linvill multiple-lump models may be applied to situations wherein carrier redistribution effects are significant.

The concept of a "lump," as used herein, involves the division of a physical zone into sections, each section called a lump. One then obtains a suitable average for each spatially distributed characteristic within a section and treats these averages as though they were the constant value of each respective characteristic throughout the section. For analytical purposes, then, each section may be treated as a point since spatial variation has been removed from within each section. The rapidity with which the characteristics vary and the degree of desired accuracy of the analysis determine the number of sections into which each zone must be divided.

The present invention, in contradistinction to previous analytical methods and apparatus, is based upon the recognition that, by reformulating the multiple-lump models of Linvill on the basis of an analogy between charge storage in the device and charge storage in the model, one can append current-controlled R-G-C transmission lines to the models of Gummel-Murphy, referred to hereinabove, to achieve precise, relatively simple physical models of semiconductor devices. These models exhibit at low frequencies, where measurements are easily performed and parasitic effects are avoided, a precisely scaled replica of the important AC characteristics of the active element at its normal higher frequencies.

It must be noted that throughout this writing the symbol "AC" is taken to mean "non-DC," as opposed to the possible restricted interpretation of purely sinusoidal operation.

As in the Gummel-Murphy models, the device modeled is considered to be charge controlled, and the stored charge is separated into two basic functional types, i.e., voltage controlled and current controlled. However, herein, in contradistinction to previous models, the current-controlled stored charge is further separated into two distinct parts.

One of said parts is primarily due to excess carriers in transit through the device and varies substantially linearly with current over a considerable range. It will be appreciated that for a transistor this linear part consists of carriers in the base zone when the transistor is operating in the active mode. As the base thickness is usually much less than a diffusion length, redistribution effects are usually not significant therein.

The second of the current controlling parts is due to zones of excess charge stored in the device over characteristic distances of the order of or greater than a diffusion length. There may be a plurality of such zones, each characterized by a particular carrier lifetime and a particular diffusion transit time. It will be appreciated that for an epitaxial transistor, charge storage of the second kind occurs primarily in the collector zone when the device is saturated.

As will be more fully discussed hereinafter, those currents which control charge storage of the second kind are sampled by placing a sampling resistor in one or more leads to the device. The voltage across each of these sampling resistors is amplified by an operational amplifier and applied to an R-G-C network. The ratio of C to G in any particular lump of the network is set equal to the time-scaled carrier lifetime and the RC product of that lump is set equal to the time-scaled diffusion transit time of that section which the R-G-C network represents. As a consequence, both minority carrier recombination and diffusion delays are accurately time-scaled for facile low frequency analysis.

DESCRIPTION OF THE DRAWING

The various features and principles of the present invention will be more readily understood from the following detailed description read in conjunction with the drawings in which.

DETAILED DESCRIPTION

Figure 1:
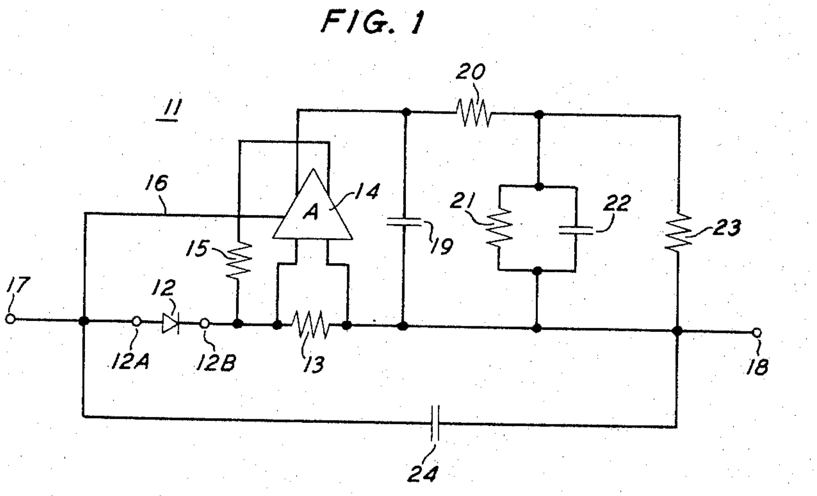
FIG. 1 is a schematic diagram of a first embodiment of the invention.

FIG. 1 depicts the module 11 for a PN junction diode 12, which comprises anode and cathode electrodes 12A and 12B respectively with associated input-output terminals 17 and 18. Circuit 11 constitutes a two-terminal diode representation which is insertable as a module into the model of the circuit of which diode 12 is an element. As pointed out heretofore, it is desirable to utilize time-scaling so that high frequency characteristics and behavior may be observed and conveniently measured at low frequencies. To this end, the associated circuitry into which module 11 is connected is preferably time-scaled by a factor K, typically $10^4$ to $10^6$. Hence any capacitances $C_m$ and inductances $L_m$ of the associated circuitry become $KC_m$ and $KL_m$. The factor K may be arbitrarily chosen to achieve ease of measurement and elimination of parasitic effects which occur at high operating frequencies.

Diode 12 is it own DC model of the module 11. Diode 12 is also an element in its AC model. However, to achieve an accurate modeling of its AC performance in accordance with the principles of this invention, the charge storage effects must be simulated on the chosen time scale.

Although thin epitaxial layers are generally used in high speed switching diodes, such diodes are often so heavily gold doped that the diffusion length for minority carriers is even less than, or at least comparable with, the epitaxial layer thickness. In this case diffusion delays comparable with diode storage times occur during "turn-off" of the device. The purely charge control model of Gummel-Murphy, referred to hereinabove, is not then very satisfactory, and, indeed, is often in error by a factor of two or more.

This inadequacy can be conveniently overcome by the particular embodiment of this invention depicted in FIG. 1, usually referred to as a "two-lump" model.

For the two-lump representation, the diode's physical zone wherein charge storage occurs is considered to be divided into two contiguous sections, called lumps. The characteristics of the zone of charge storage, then, are represented in the model by the R-G-C network. Corresponding to each section of the diode is a branch of the R-G-C network which branch includes, in parallel, a capacitor to represent charge storage in said section and a conductor to represent minority carrier recombination in said section. A resistor disposed between the two branches of the network represents minority carrier redistribution between the two sections of the physical zone of the diode.

As shown in FIG. 1, a double-ended operational amplifier 14 links the diode 12 with the R-G-C network. The double-ended operational amplifier characteristically comprises two inputs, two outputs, and a ground line. Each output has the polarity of that input opposite to which it is drawn and the voltage between the two outputs is in constant proportion to the voltage between the two inputs and is, ideally, independent of any common-mode voltage on the ground line.

Examining FIG. 1 in more detail, one finds the inputs to amplifier 14 applied across sampling resistor 13 which is disposed serially with diode 12 and is between cathode electrode 12B and external terminal 18. The ground line 16 of amplifier 14 is connected to anode electrode 12A of diode 12, and a feedback resistor 15 is disposed between cathode electrode 12B and that output of amplifier 14 which is of polarity like the diode side of resistor 13. The other output of amplifier 14 is applied to the R-G-C network which comprises shunt capacitor (C) 19, series resistor (R) 20, shunt conductor (G) 21, and shunt capacitor (C) 22 in parallel with each other and with terminating conductor ($G_s$) 23, all shunt elements terminating at external terminal 18. With this combination of linear amplifier and passive elements, a voltage which is linearly proportional to the charge controlling current which flows through diode 12 and sampling resistor 13 is applied to the R-G-C network. By suitably selecting element values, the controlling time-constants and stored charge may be scaled as desired with resultant time-scaling of all time varying parameters.

One immediately notes an apparent deviation from symmetry in that capacitor 19 lacks the parallel conductance one expects in every branch of the lumped R-G-C transmission line. However, sampling resistor 13, having resistance $r$, is reflected through amplifier 14, having gain A, and has the effect of a resistor of magnitude $rA$ in parallel with capacitor 19. Thus, for a diode having substantially constant minority carrier lifetime throughout the charge storage zone, a first equation for parameter determination is:

$$rA=G^{-1} \quad (1)$$

The length (X) of the lumped R-G-C line is set equal to the physical length of the diode zone which charge storage it represents. For convenience, one usually assumes lumps of equal length (W), so that for the two-lump model herein, $W=0.5X$.

The parameters of the lumped R-G-C line are in relation such that:

$$\frac{C}{G}=Kt=\text{time-scaled minority carrier lifetime,} \quad (2)$$

and $$RC=\frac{KW^2}{D}=\text{time-scaled diffusion transit time,} \quad (3)$$

wherein C is the capacitance of capacitor 19 and of capacitor 22, G is conductance of conductor 21, R is resistance of resistor 20, $t$ is minority carrier lifetime (assumed constant in both sections), and D is the diffusion constant for carriers in both sections of the device.

Conductor 23 ($G_s$) may be, as conditions require, omitted, or may be used to represent carriers lost through surface recombination with recombination velocity ($v$), or may be used to represent, in a transistor, carrier transit through a collector junction with scatter-limited velocity ($v$), in which case $$\frac{WG_s}{C}=\frac{v}{K} \quad (4)$$

Under DC conditions it is required that all of the current flowing in terminals 17 and 18 flow through the diode 12. This requires that DC feedback resistor 15 ($R_c$) be set equal to the DC resistance of the R-G-C network. For the two-lump model this resistance is simply $$R+G^{-1}+G_s^{-1}$$

Consistency relations may then be invoked to show that once resistor 15 is determined as described, this value of resistance will be correct for all operating conditions.

Capacitor 24 ($C_v$) disposed between anode electrode 12A and external terminal 18 represents the diode's voltage controlled charge, and has capacitance equal to K times the space-charge capacitance of the diode.

The following table sets forth a set of illustrative parameters for a time-scaled self-analog model of the type depicted in and described with reference to FIG. 1:

| | | |
|---|---|---|
| Time-scaling factor (K) | | $10^6$ |
| Diode (12) | | |
| Minority carrier lifetime ($t$) | secs | $3\times10^{-9}$ |
| Diffusion transit time ($t^*$) | secs | $2.25\times10^{-9}$ |
| Section (lump) width (W) | cms | $1.5\times10^{-4}$ |
| Sampling resistor ($r$) | ohm | 5 |
| Capacitor ($C_V$) | farads | $1.5\times10^{-6}$ |
| Amplifier (gain) | | 100 |
| Shunt capacitors (C) each | farads | $6\times10^{-6}$ |
| Shunt conductor (G) | mhos | $2\times10^{-3}$ |
| Series resistor (R) | ohms | 375 |
| Feedback resistor ($R_c$) | do | 875 |

The requirements hereinabove are sufficient to ensure that each branch of the model stores a multiple K of that charge stored in the diode section represented. Furthermore, it will be noted that the equations are not completely restrictive, i.e., one is free to choose either R, or C, or G, or the $r$A-product independently for convenience.

This diode model will be sufficiently accurate for most practical semiconductor diodes in all regions of operating. However, for particular diodes in which charge is stored over an even more extensive characteristic distance, more lumps, i.e., additional branches of the lumped R-G-C tiansmission line, may be added according to the principles hereinabove described to bring the model to within any degree of requisite exactness.

Figure 2:
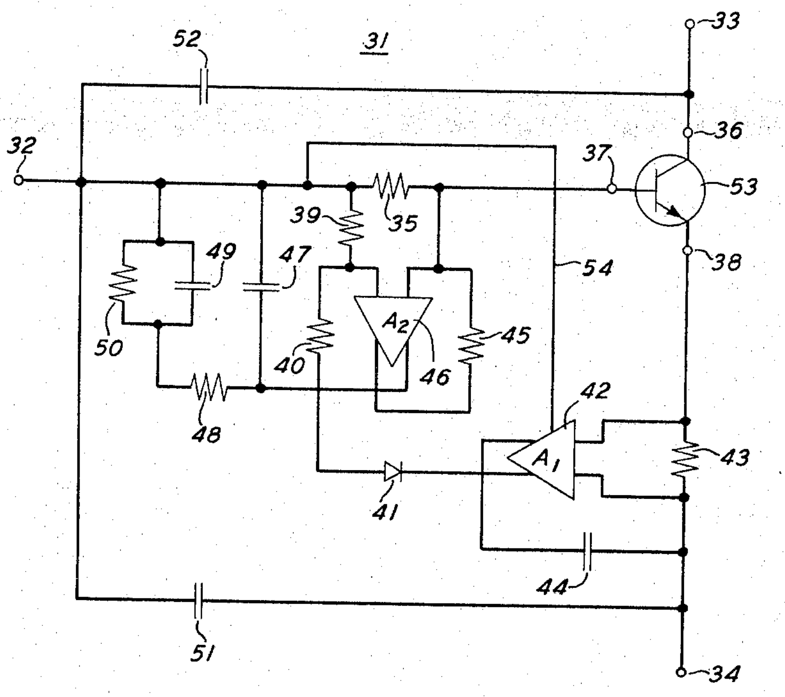
FIG. 2 is a schematic diagram of a second embodiment of the invention.

FIG. 2 depicts schematically a second embodiment of this invention, module 31, for time-scaled modeling of a transistor.

The module 31 includes an NPN junction transistor 53, the device to be modeled, which comprises collector, base, and emitter electrodes 36, 37, and 38, respectively, with their associated input-output terminals 32, 33, and 34. Module 31 is a three-terminal model and is insertable into a correspondingly time-scaled model of any circuit in which the transistor 53 is to be an element.

As in module 11, the voltage controlled charge components are represented in module 31 by shunt capacitors 51 and 52. Capacitor 51 has capacitance equal to K times the capacitance of the emitter-base junction. Capacitor 52 has capacitance equal to K times the capacitance of the collector-base junction.

The circuit relationships of FIG. 2 are particularly illustrative of the basic cognition of this present invention, namely, the need to separate the various zones of current controlled charge storage according to the operative characteristics of the zones internal to the device wherein the charge storage occurs. To this end, the circuit of FIG. 2 is characterized by two storage units and a feedback loop between these units, all more fully described immediately hereinbelow.

The first of these two units comprises sampling resistor 43 inserted in series with the emitter lead 34 of transistor 53, amplifier 42 applied across resistor 43, and capacitor 44 applied to one output of amplifier 42. In proper circuit relationship, this unit stores, on capacitor 44, a multiple (K) of the charge stored in transistor 53 when the transistor is operating in the active mode. This charge will be called "active mode storage" hereinbelow.

The second of these two units comprises sampling resistor 35 in series with the base lead of transistor 53, amplifier 46 applied across resistor 35, and a two-lump R-G-C network consisting of capacitors (C) 47 and 49, resistor (R) 48, and conductor (G) 50. In proper circuit relationship, this unit stores a multiple (K) of that charge stored in transistor 53 when the transistor is operating in the saturated mode. This charge will be termed "saturated mode storage" hereinbelow. Since the majority of high frequency transistors are of the epitaxial type wherein saturated mode storage occurs primarily in the relatively extended epitaxial collector zone adjacent the collector-base junction, saturated mode charge storage can, in general, be accurately represented only by considering both minority carrier recombination and diffusion delays.

Double representation of active mode storage which would otherwise occur because of base current flowing in sampling resistor 35 is canceled by the feedback arrangement including, in series, an output of amplifier 42 with its ground line 54, resistors 39 and 40, and diode 41. Diode 41 is empirically chosen to compensate for the forward bias voltage across the emitter-base junction of transistor 53. Resistors 39 and 40 form a voltage divider arranged so that the feedback current in those resistors produces a voltage drop across resistor 39 sufficient to cancel that part of the voltage drop across resistor 35 which is due to active mode storage. Since the voltage drop across resistor 39 is necessarily negligible compared to the voltage drop across the series combination of resistor 40 and diode 41, this facilitates selection of resistor 40.

Elements of the two-lump R-G-C network, consisting of capacitors 47 and 49, resistor 48, and conductor 50, may be selected in the same manner as were the analogous elements in FIG. 1, described hereinabove.

Resistor 45 is a DC feedback resistor analogous in function to resistor 15 of FIG. 1 and is similarly determined.

In both the circuits of FIG. 1 and FIG. 2, selection of element values has been discussed in the light of their determination by calculation. However, in view of the fact that once a model has been constructed it may be used indefinitely in a countless variety of circuit analysis situations, the modeler interested in precision will be well repaid for the time spent in empirically optimizing his models. Similarly, the inclusion of manually controlled or feedback controlled amplifier gains, voltage variable capacitors and the like may be included at the expense of additional complexity. However, the basic principles of the invention, as set forth in the foregoing, remain the same. That these principles may be applied in the modeling of other active devices, such as field-effect transistors, will become obvious to those in the art.

The principles of this invention have been applied to the modeling of both saturating and nonsaturating logic circuits with consistent success. Waveforms of the millisecond models (similar to FIGS. 1 and 2) compared favorably with the waveforms of the actual constructed integrated circuits throughout all modes of small signal and pulsed, large signal, saturated operation, provided the signals were not so large as to cause significant conductivity modulation within the semiconductive elements.

It is anticipated that the principles of this invention will be applied to effect simple and economical apparatus for production-line testing of contemporary and future high frequency semiconductor devices. Once the model is constructed and optimized for desired characteristic parameter sensitivities, production-line high frequency devices can be inserted into the model and tested cheaply, conveniently, and accurately with inexpensive audio frequency equipment.

The principles of the invention have been illustrated as applied to junction diodes and NPN transistors. These principles may be applied to numerous other types of semiconductor elements such as PNP and field-effect transistors, for example, as well as various other arrangements without departing from the spirit and scope of the invention.

What is claimed is:

1. A time-scaled circuit model of a semiconductive element having at least one voltage controlled charge storage zone and at least one current controlled charge storage zone, said model comprising the semiconductive element itself, and
means for modeling at least one voltage controlled charge storage zone,
said model characterized by means for modeling at least one current controlled charge storage zone,
said means for modeling at least one current controlled charge storage zone comprising at least one unit in circuit with said semiconductive element, where a unit includes
a sampling resistor in series with said element, and
an amplifier connected to said sampling resistor amplifying the voltage drop across said sampling resistor,
a resistance-conductance-capacitance (R-G-C) network applied to the output of said amplifier, said R-G-C network having parameters $C/G=Kt$ and $RC=Kt^*$ where $t$ is the lifetime of minority carriers, $t^*$ is the diffusion transit time across a section of the semiconductive element and K is a charge multiplication factor, the sampling resistor, amplifier, and R-G-C network being so related as to provide desired charge multiplication (K) for at least one significant zone of charge storage within the element, and
means responsive to an output of said amplifier for providing feedback to ensure that the R-G-C network stores only a multiple (K) of the charge stored in said zone which said unit represents
whereby said model is usable for measuring indirectly high frequency parameters of said semiconductive element at relatively low frequencies.

2. An analog model of a semiconductor element as claimed in claim 1 wherein the element is a transistor.

3. An analog model of a semiconductor element as claimed in claim 1 wherein the element is a diode.

4. An analog model as claimed in claim 3 wherein
said amplifier comprises a double-ended operational amplifier having a ground line to the anode of said diode,
the means for providing feedback comprises a feedback resistor connected between an output of said amplifier and the cathode of said diode, and wherein
the means for modeling at least one voltage controlled charge storage zone comprises a capacitive element shunting said diode and sampling resistor and having a capacitance equal to the diode junction capacitance multiplied by the charge multiplication factor K.

5. An analog model as claimed in claim 2 wherein
said at least one unit has its sampling resistor connected in series with the base lead of said transistor, the amplifier of said unit being a double-ended operational amplifier, and wherein
said model further comprises a second unit having its sampling resistor connected in series with the emitter lead of said transistor, the amplifier of said second unit being a double-ended operational amplifier,
a capacitor connected between the amplifier of said second unit and the emitter lead of said transistor,
a first capacitive element applied between the collector and base leads and having a capacitance equal to the capacitance of the collector-base junction of said transistor multplied by the charge multiplication factor K,
and a second capacitive element applied between the base and emitter leads of said model and having a capacitance equal to the capacitance of the emitter-base junction of said transistor multiplied by the charge multiplication factor K,
all other parameters being determined such that said capacitor stores a multiple K of that current controlled charge stored in the active mode and said R-G-C network stores a multiple K of that current controlled charge stored in the saturated mode of said transistor.

6. The method of testing a high frequency semiconductive device by combining it with an associated circuit comprising the steps of connecting a sampling resistor in series with at least one of the leads of the device, sampling the voltage across the sampling resistor, amplifying the sampled voltage in an operational amplifier, supplying the amplified voltage to a lumped resistance-conductance-capacitance (R-G-C) transmission line, said transmission line having parameters $C/G=Kt$ and $RC=Kt^*$ where $t$ is the lifetime of minority carriers, $t^*$ is the diffusion transit time across a section of the semiconductive device and K is a charge multiplication factor, and measuring indirectly a high frequency parameter of said semiconductive device by testing the device and associated circuit at a relatively low frequency.

References Cited

UNITED STATES PATENTS 2,907,950 10/1959 Raisbeck ____________ 324—57

RUDOLPH V. ROLINEC, Primary Examiner

E. L. STOLARUN, Assistant Examiner

U.S. Cl. X.R.

307—300